United States Patent
Ueda et al.

(10) Patent No.: US 7,803,490 B2
(45) Date of Patent: Sep. 28, 2010

(54) DIRECT METHANOL FUEL CELL

(75) Inventors: Hideyuki Ueda, Ibaraki (JP); Shinsuke Fukuda, Moriguchi (JP)

(73) Assignee: Panasonic Corporation, Osaka (JP)

( * ) Notice: Subject to any disclaimer, the term of this patent is extended or adjusted under 35 U.S.C. 154(b) by 1259 days.

(21) Appl. No.: 11/312,369

(22) Filed: Dec. 21, 2005

(65) Prior Publication Data

US 2006/0134508 A1    Jun. 22, 2006

(30) Foreign Application Priority Data

Dec. 21, 2004    (JP)    ............... 2004-368787

(51) Int. Cl.
     *H01M 4/00*      (2006.01)
(52) U.S. Cl. ........................ 429/444; 429/40
(58) Field of Classification Search ........... None
See application file for complete search history.

(56) References Cited

U.S. PATENT DOCUMENTS

2003/0008200 A1 *    1/2003    Ito et al. ................... 429/44

2004/0241519 A1 *    12/2004    Howard ................... 429/33

FOREIGN PATENT DOCUMENTS

JP    2002-110191 A    4/2002
JP    2002-175817 A    6/2002

\* cited by examiner

*Primary Examiner*—Patrick Ryan
*Assistant Examiner*—Muhammad Siddiquee
(74) *Attorney, Agent, or Firm*—McDermott Will & Emery LLP (57) ABSTRACT

A direct methanol fuel cell of the present invention includes a unit cell having an electrolyte membrane, an anode on one surface of the electrolyte membrane, and a cathode on the other surface of the electrolyte membrane. The anode includes an anode catalyst layer and an anode diffusion layer. The anode catalyst layer is in contact with a surface of the electrolyte membrane. The anode diffusion layer is in contact with a surface of the anode catalyst layer opposite to the surface of the anode catalyst layer in contact with the electrolyte membrane. A methanol flux value $J_{GDL}$ of the anode diffusion layer and a methanol flux value $J_{PEM}$ of the electrolyte membrane satisfy the following relations:

$$J_{GDL} = 1 \times 10^{-5} \text{ to } 5 \times 10^{-4} \text{ mol/(cm}^2 \cdot \text{min.}), \quad \text{(i)}$$

and $$J_{PEM} \times J_{GDL} \leq 1 \times 10^{-8} \text{ [mol/(cm}^2 \cdot \text{min.)]}^2. \quad \text{(ii)}$$

7 Claims, 3 Drawing Sheets

DIRECT METHANOL FUEL CELL

FIELD OF THE INVENTION

The present invention relates to a direct methanol fuel cell that uses methanol or an aqueous solution of methanol as the fuel.

BACKGROUND OF THE INVENTION

As portable compact electronics such as cell phones, personal digital assistances (PDAs), notebook computers and camcorders perform more functions, they consume more electric power and operate for a longer period of time. In order to satisfy such increasing power demand and to achieve longer continuous operation, batteries for portable compact electronics having a higher energy density are in strong demand.

Currently, lithium secondary batteries are widely used as the main power supply for portable compact electronics. Lithium secondary batteries are expected to have an energy density of about 600 Wh/L by 2006, which is considered as the maximum energy density for lithium secondary batteries. As an alternative to lithium secondary batteries, early commercialization of fuel cells having a solid polymer electrolyte membrane is eagerly awaited.

Among fuel cells, direct methanol fuel cells (DMFCs) are attracting attention and being vigorously studied in which a fuel such as methanol or an aqueous solution of methanol is fed directly into the fuel cell for power generation without converting the fuel into hydrogen. This is because methanol has a very high theoretical energy density and offers advantages of simple system design and easy storage.

A single unit cell contained in a direct methanol fuel cell comprises a membrane electrode assembly (MEA) and separators disposed on both sides of the MEA. The membrane electrode assembly (MEA) comprises a solid polymer electrolyte membrane, an anode attached to one surface of the solid polymer electrolyte membrane, and a cathode attached to the other surface of the solid polymer electrolyte membrane. The anode and the cathode each comprise a catalyst layer and a diffusion layer.

A direct methanol fuel cell generates electricity (power) by feeding a fuel (i.e., methanol or an aqueous solution of methanol) directly into the anode and air to the cathode. In the direct methanol fuel cell, the following reaction occurs.

Anode: $CH_3OH + H_2O \rightarrow CO_2 + 6H^+ + 6e^-$

Cathode: $3/2 O_2 + 6H^+ + 6e^- \rightarrow 3H_2O$

That is, methanol reacts with water at the anode to produce carbon dioxide, protons and electrons. The protons pass through the electrolyte membrane to reach the cathode. At the cathode, oxygen combines with the protons and electrons migrated into the cathode through an external circuit to produce water.

In order to achieve commercialization of direct methanol fuel cells, however, the following problem must be solved.

Direct methanol fuel cells employ, as the electrolyte membrane, a perfluoroalkyl sulfonic acid membrane from the viewpoint of proton conductivity, thermal resistance and resistance to oxidation. Electrolyte membranes of this type comprise a main chain of hydrophobic polytetrafluoroethylene (PTFE) and a side chain of a perfluoro group having hydrophilic sulfonic acid group fixed at the terminal of the perfluoro group. Accordingly, methanol having both hydrophilic and hydrophobic parts is a suitable solvent for a perfluoroalkyl sulfonic acid membrane because methanol can easily pass through the polymer electrolyte membrane. However, a phenomenon called "methanol crossover" occurs in which methanol fed into the anode pass through the electrolyte membrane to the cathode, without reacting. This methanol crossover not only reduces the fuel utilization efficiency but also the potential of the cathode, which significantly degrades power generation characteristic. This methanol crossover tends to increase as the methanol concentration and the operating temperature get higher.

In order to reduce methanol crossover, in addition to the development of novel electrolyte membranes, various proposals are made to modify the structure of anodes.

For example, in order to reduce methanol crossover at the upstream side of a fuel flow channel and to prevent supply shortage of methanol at the downstream side of the fuel flow channel so as to uniformly supply a fuel to the anode, Japanese Laid-Open Patent Publication No. 2002-110191 proposes a structure in which the methanol permeability coefficient of an anode diffusion layer is higher at the downstream side of the fuel flow channel. The anode diffusion layer disclosed in Japanese Laid-Open Patent Publication No. 2002-110191 comprises a carbon paper substrate and a mixed layer containing carbon black and polytetrafluoroethylene formed on a surface of the substrate. In order to increase the methanol permeability coefficient of the anode diffusion layer along the fuel flow channel, the publication further discloses to reduce the thickness of the mixed layer, to reduce the weight ratio of the polytetrafluoroethylene, to reduce the water repellency of the carbon black, and to increase the porosity and/or pore size of the carbon black.

Another problem that must be solved to achieve commercialization of direct methanol fuel cells is removability of carbon dioxide ($CO_2$) gas produced at the anode from the anode diffusion layer. In other words, the carbon dioxide gas permeability of anode diffusion layer should be improved. The carbon dioxide gas produced at the anode passes through the anode diffusion layer, reaches the flow channel of a separator and then to the outside. If the anode diffusion layer has low gas permeability, some of the generated gas might accumulate inside the diffusion layer, inhibiting the dispersion of fuel into the catalyst layer. Furthermore, the carbon dioxide gas might gradually coalesce to form large bubbles, which squeeze the fuel from the pores of the diffusion layer, reducing the supply amount of fuel to the anode catalyst layer. As a result, power generation characteristic at a high current density, which requires a large amount of fuel, decreases significantly.

In order to overcome this problem, Japanese Laid-Open Patent Publication No. 2002-175817 proposes to provide separate (completely segregated) flow channels for liquid fuel and exhaust gas on an anode-side plate (i.e., separator), and to impart liquid permeability and gas impermeability to the area of an anode diffusion layer that faces the flow channel for liquid fuel, as well as gas permeability to the area of the diffusion layer that faces the flow channel for exhaust gas.

Such conventional structures as described above, however, cannot provide a direct methanol fuel cell having excellent power generation characteristic without impairing fuel utilization efficiency. Many problems still remain.

Japanese Laid-Open Patent Publication No. 2002-110191 fails to give adequate consideration to the methanol permeability coefficient of the anode diffusion layer. That is, the effect of methanol concentration, the effect of operating temperature (temperature for power generation) and the balance between the electrolyte membrane and the methanol permeability coefficient are not fully discussed. The fuel cell disclosed by the above publication thus suffers from the problem that the power generation characteristic degrades significantly at a high current density in the case of, for example, using highly concentrated methanol or increasing the operating temperature (temperature for power generation).

As for the fuel cell disclosed by Japanese Laid-Open Patent Publication No. 2002-175817, there is a prospect that the problems such as the supply of a sufficient amount of fuel and the removal of carbon dioxide will be solved. The publication, however, fails to disclose any solution for methanol crossover.

In view of the foregoing, an object of the present invention is to provide a direct methanol fuel cell having excellent power generation characteristic without impairing fuel utilization efficiency by reducing methanol crossover and ensuring that a sufficient amount of fuel is supplied to the catalyst layer. Another object of the present invention is to provide a direct methanol fuel cell having excellent power generation characteristic by also improving the removability of carbon dioxide from the anode catalyst layer.

BRIEF SUMMARY OF THE INVENTION

The present invention relates to a direct methanol fuel cell comprising a unit cell having an electrolyte membrane, an anode on one surface of the electrolyte membrane, and a cathode on the other surface of the electrolyte membrane, the anode comprising an anode catalyst layer and an anode diffusion layer, the anode catalyst layer being in contact with a surface of the electrolyte membrane, the anode diffusion layer being in contact with a surface of the anode catalyst layer opposite to the surface of the anode catalyst layer in contact with the electrolyte membrane, wherein a methanol flux value $J_{GDL}$ of the anode diffusion layer and a methanol flux value $J_{PEM}$ of the electrolyte membrane satisfy the following relations: (i) $J_{GDL}=1\times10^{-5}$ to $5\times10^{-4}$ mol/(cm$^2$·min.), and (ii) $J_{PEM}\times J_{GDL}\leq1\times10^{-8}$ [mol/(cm$^2$·min.)]$^2$.

In the direct methanol fuel cell, the anode diffusion layer preferably has an air permeability $Q_{Air}$ of 200 to 1000 cc/(cm$^2$·min.·kPa).

In the direct methanol fuel cell, preferably, a surface layer having a porous structure is formed on a surface of the anode diffusion layer. The surface layer preferably comprises a water repellent resin fine particle and a water repellent binder material.

In another preferred embodiment of the present invention, a surface layer having a porous structure is formed on a surface of the anode diffusion layer. The surface layer comprises an electron conductive porous material and a water repellent binder material.

The present invention further relates to a method for generating power using a direct methanol fuel cell comprising a unit cell having an electrolyte membrane, an anode on one surface of the electrolyte membrane, and a cathode on the other surface of the electrolyte membrane, the anode comprising an anode catalyst layer and an anode diffusion layer, the anode catalyst layer being in contact with a surface of the electrolyte membrane, the anode diffusion layer being in contact with a surface of the anode catalyst layer opposite to the surface of the anode catalyst layer in contact with the electrolyte membrane, the method comprising the steps of: (a) selecting an anode diffusion layer and an electrolyte membrane such that a methanol flux value $J_{GDM}$ of the anode diffusion layer and a methanol flux value $J_{PEM}$ of the electrolyte membrane, which are measured by allowing the anode diffusion layer and the electrolyte membrane to come into contact with an aqueous solution having a certain methanol concentration at a certain temperature, satisfy the following relations: (i) $J_{GDL}=1\times10^{-5}$ to $5\times10^{-4}$ mol/(cm$^2$·min.), and (ii) $J_{PEM}\times J_{GDL}\leq1\times10^{-8}$ [mol/(cm$^2$·min.)]$^2$; (b) determining a concentration of methanol to be contained in fuel and a temperature for operating the fuel cell based on the temperature and the methanol concentration used for the measurement of the $J_{GDL}$ and the $J_{PEM}$; and (c) generating power at the temperature determined in the step (b) by feeding fuel containing methanol at the concentration determined in the step (b) to the anode.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Embodiments of the present invention will be described below with reference to the accompanying drawings.

Embodiment 1

Figure 1:
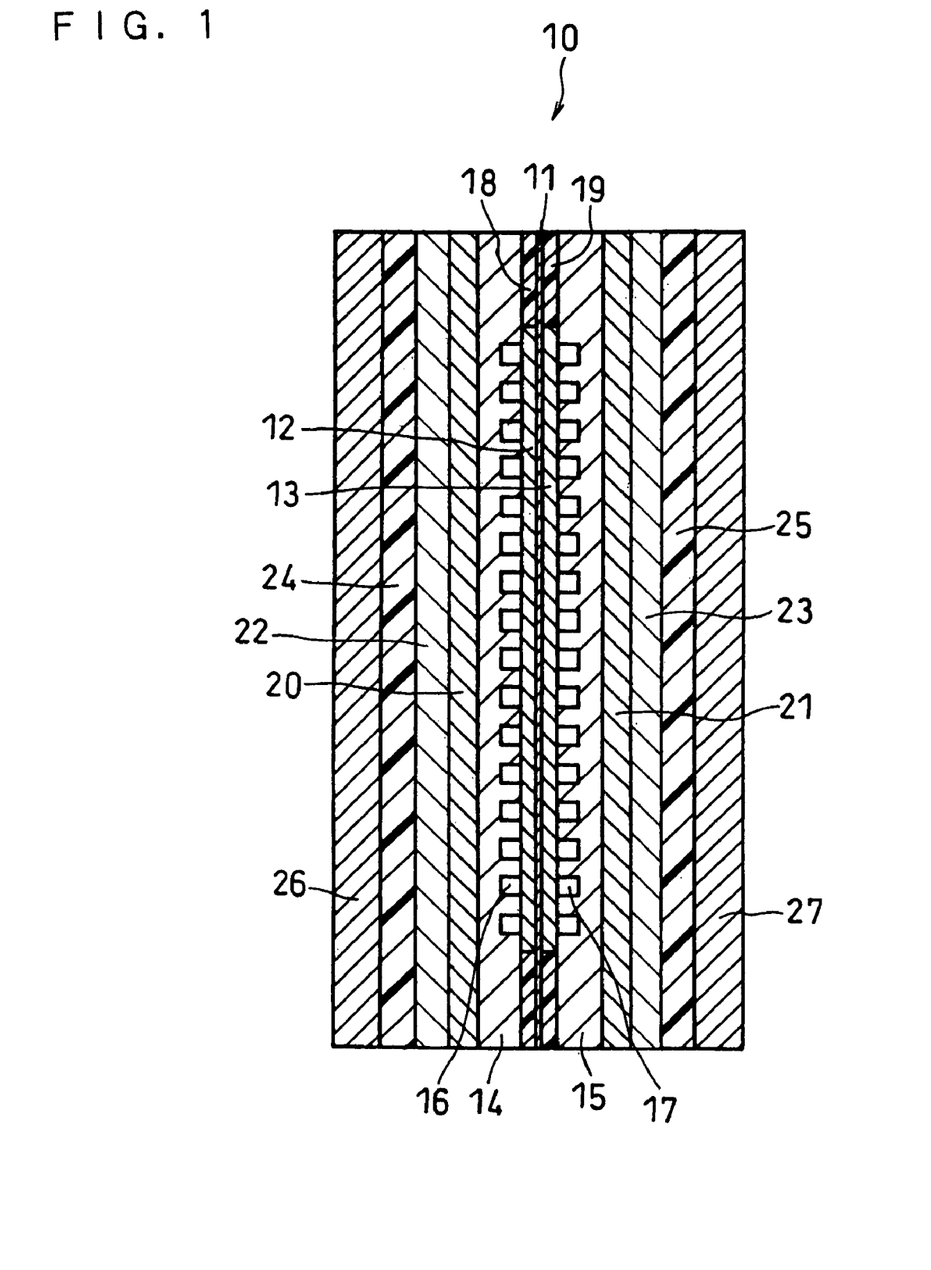
FIG. 1 is a schematic vertical cross sectional view of a unit cell incorporated in a fuel cell according to an embodiment of the present invention.

FIG. 1 shows a unit cell of a fuel cell according to an embodiment of the present invention.

A unit cell 10 shown in FIG. 1 comprises an electrolyte membrane 11, an anode 12 and a cathode 13 sandwiching the electrolyte membrane 11. A membrane electrode assembly (MEA) is composed of the electrolyte membrane 11, the anode 12 and the cathode 13.

The MEA is sandwiched by an anode-side separator plate 14 and a cathode-side separator plate 15 that have electron conductivity. On the outer surface of the separator plate 14 are laminated an anode-side current collector plate 20, a heater 22 for heating the MEA, an insulating plate 24 for electrically insulating the cell from the outside, and an end plate 26. Likewise, on the outer surface of the separator plate 15 are laminated a cathode-side current collector plate 21, a heater 23 for heating the MEA, an insulating plate 25 for electrically insulating the cell from the outside, and an end plate 27. All of them are tightly fixed by applying pressure in the laminating direction using clamping rods (not shown in the drawing).

The anode-side separator plate 14 has a fuel flow channel 16 made of a groove for feeding a fuel to the anode and removing a reaction product (e.g., carbon dioxide) formed on the surface to be in contact with the anode. Likewise, the cathode-side separator plate 15 has an oxidant flow channel 17 made of a groove for feeding air to the anode formed on the surface to be in contact with the cathode.

Gas sealants 18 and 19 are placed on the outer peripheries of the anode 12 and the cathode 13, respectively, so as to prevent a fuel and air from leaking out.

Figure 2:
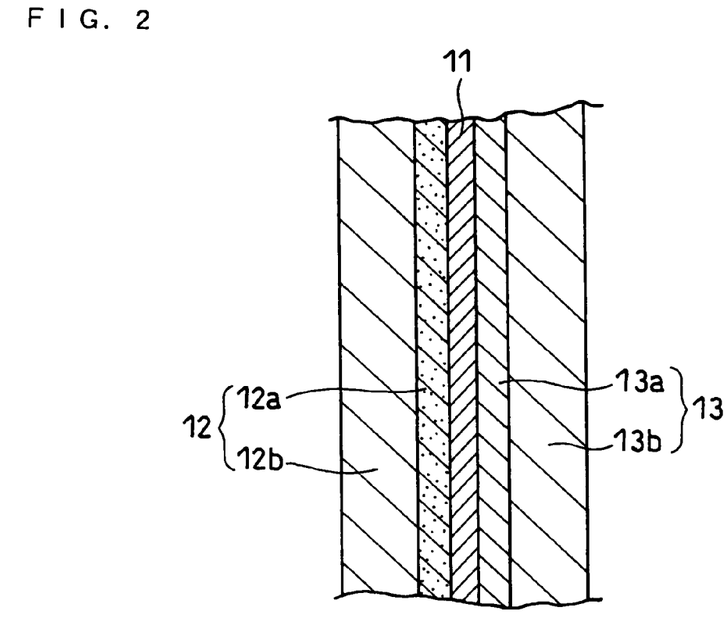
FIG. 2 is a partially enlarged view of the membrane electrode assembly (MEA) of the unit cell shown in FIG. 1.

FIG. 2 is an enlarged view of the MEA described above. The anode 12 comprises a catalyst layer 12a attached to one surface of the electrolyte membrane 11 and a diffusion layer 12b attached to the other surface of the catalyst layer 12a (i.e., the surface of the catalyst layer 12a not in contact with the electrolyte membrane 11). Similarly, the cathode 13 comprises a catalyst layer 13a attached to the other surface of the electrolyte membrane 11 and a diffusion layer 13b attached to the other surface of the catalyst layer 13a (i.e., the surface of the catalyst layer 13a not in contact with the electrolyte membrane 11).

In the present invention, the anode diffusion layer 12b has a methanol flux value $J_{GDL}$ of $1\times10^{-5}$ to $5\times10^{-4}$ mol/(cm$^2$·min.). The electrolyte membrane 11 has a methanol flux value $J_{PEM}$. A product obtained by multiplying the $J_{PEM}$ by the $J_{GDL}$ should be not greater than $1\times10^{-8}$ [mol/(cm$^2$·min.)]$^2$.

For example, in the case of using a fuel containing methanol at a high concentration, or in the case of operating a fuel cell while the fuel cell has a high temperature, a conventional anode diffusion layer and a conventional electrolyte membrane (e.g., Nafion 117) allow a large amount of methanol to cross over the membrane because the diffusion layer has a large methanol flux value. In order to prevent the methanol crossover, it is necessary to reduce the methanol flux value of the anode diffusion layer. In contrast, in the case of using a fuel containing methanol at a low concentration, or in the case of operating a fuel cell while the fuel cell has a low temperature, the methanol flux value of the anode diffusion layer becomes small. In this case, it is necessary to increase the methanol flux value of the anode diffusion layer so as to prevent power generation characteristic at a high current density from degrading.

In the present invention, because the anode diffusion layer and the electrolyte membrane have methanol flux values within the above-mentioned ranges, it is possible to provide excellent power generation characteristic regardless of whether the methanol concentration of fuel is high or low, or whether the operating temperature of the fuel cell is high or low. In other words, because the anode diffusion layer 12b and the electrolyte membrane 11 have methanol flux values within the above-mentioned ranges, it is possible to ensure that a sufficient amount of fuel is supplied to the catalyst layer at any operating temperature and at any methanol concentration. That is, both the reduction of concentration polarization and the reduction of methanol crossover can be achieved simultaneously.

When the anode diffusion layer 12b has a methanol flux value $J_{GDL}$ of less than $1\times10^{-5}$ mol/(cm$^2$·min.), the supply rate of fuel to the anode catalyst layer 12a is low, and power generation characteristic at a high current density degrades significantly. When the anode diffusion layer 12b has a methanol flux value $J_{GDL}$ of greater than $5\times10^{-4}$ mol/(cm$^2$·min.), the supply of fuel to the anode catalyst layer 12a is nonuniform. To be more specific, the fuel supply becomes excessive at the upstream side of the fuel flow channel whereas the fuel supply becomes insufficient at the downstream side of the fuel flow channels. As a result, the power generation characteristic degrades. This behavior is particularly noticeable when the amount of fuel supplied to the fuel cell is small.

When the product obtained by multiplying the methanol flux value $J_{GDL}$ of the diffusion layer 12b by the methanol flux value $J_{PEM}$ of the electrolyte membrane 11 (i.e., $J_{GDL} \times J_{PEM}$) is greater than $1\times10^{-8}$ [mol/(cm$^2$·min.)]$^2$, the methanol crossover is large, and thus fuel utilization efficiency as well as power generation characteristic degrades.

The methanol flux values of the anode diffusion layer and the electrolyte membrane vary according to changes in the concentration of methanol in fuel and in the operating temperature of the fuel cell. For this reason, the methanol flux values of the anode diffusion layer and the electrolyte membrane are preferably within the above ranges in an intended methanol concentration and operating temperature.

In the present invention, the methanol flux value of the anode diffusion layer $J_{GDL}$ may be adjusted relative to the methanol flux value $J_{PEM}$ of the electrolyte membrane such that the product of $J_{PEM}$ and $J_{GDL}$ as well as the value of $J_{GDL}$ fall within the above-mentioned ranges. Alternatively, on the assumption that the $J_{GDL}$ of the anode diffusion layer is $1\times10^{-5}$ to $5\times10^{-4}$ mol/(cm$^2$·min.), an electrolyte membrane having a $J_{PEM}$ that yields a product $J_{PEM} \times J_{GDL}$ of not greater than $1\times10^{-8}$ [(mol/cm$^2$·min.)]$^2$ may be selected.

The methanol flux value of the anode diffusion layer can be adjusted as follows, for example.

The methanol flux value of the anode diffusion layer 12b may be adjusted by, for example, changing the thickness of the diffusion layer 12b. The thickness of the diffusion layer 12b is preferably 100 to 500 μm. When the diffusion layer 12b has a thickness within this range, the balance among diffusibility of fuel, removability of carbon dioxide and electron conductivity can be optimized.

The diffusion layer 12b can be made of, for example, a conductive porous material having excellent diffusibility of fuel, removability (permeability) of carbon dioxide and electron conductivity. Specific examples of such material include carbon paper and carbon cloth.

Figure 3:
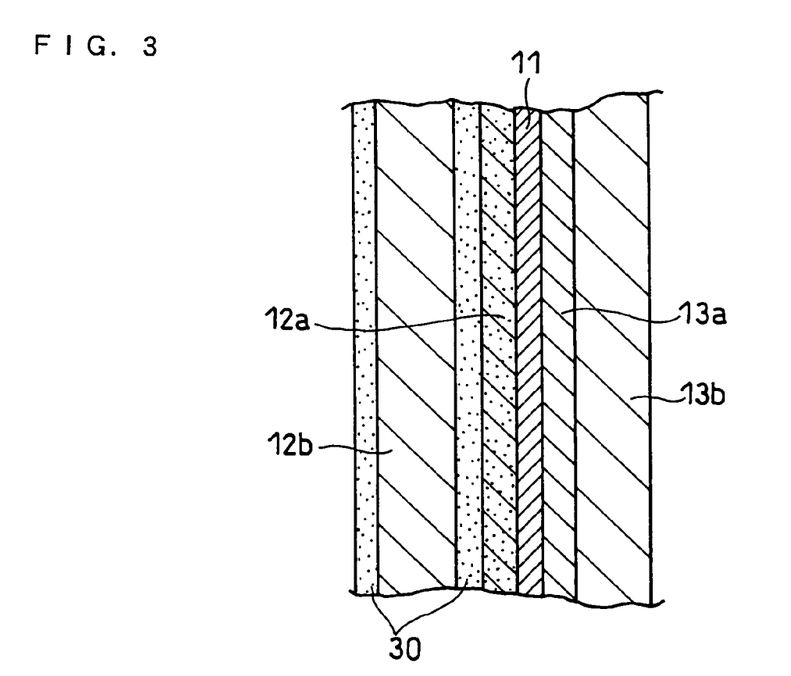
FIG. 3 is a partially enlarged view of an MEA of a unit cell incorporated in a fuel cell according to another embodiment of the present invention.

Alternatively, the methanol flux value of the anode diffusion layer 12b can be adjusted by forming a surface layer 30 having a porous structure on a surface of the diffusion layer 12b, as shown in FIG. 3 in which the same reference numbers are given to the same components of FIG. 2. FIG. 3 shows a case in which the surface layer 30 is formed on each surface of the diffusion layer 12b.

In the case of forming a surface layer on a surface of the anode diffusion layer, the methanol flux value $J_{GDL}$ of the anode diffusion layer can be adjusted by, for example, changing the surface property, porosity and thickness of the surface layer.

The surface layer 30 having a porous structure can be made of, for example, a water repellent resin fine particle and a water repellent binder material. Examples of the water repellent resin fine particle include polytetrafluoroethylene (PTFE) resin fine particle and tetrafluoroethylene-hexafluoropropylene copolymer (FEP) resin fine particle. Examples of the water repellent binder material include fluorocarbon resin and silicon resin.

Since the water repellent resin fine particle and the water repellent binder material are contained, a surface layer having extremely high water repellency (i.e., extremely low surface energy) and a macro-porous structure is formed on the surface of the diffusion layer. Thereby, it is possible to control the flux value of fuel, at which the fuel permeates the entire diffusion layer, to be uniform. Accordingly, even when an electrolyte membrane having a high methanol flux value is used, it is possible to ensure that a certain amount of fuel is supplied into the catalyst layer, at the same time, the reduction of methanol crossover can be achieved. In this case, even if the surface layer is thin, sufficient effect can be obtained. The surface of the surface layer containing the water repellent resin fine particle and the water repellent binder material and the inner wall of pores of a first layer has asperities resulting from the shape of the water repellent resin particle (i.e., a fractal surface). Due to the asperity, the water repellency is further enhanced, resulting in super-water repellency. For this reason, even if the surface layer is thin, power generation characteristic can be improved.

Moreover, the surface layer containing the water repellent resin fine particle and the water repellent binder material does not hinder the removabilitiy of reaction product (e.g., carbon dioxide). Accordingly, a fuel cell having excellent power generation characteristic particularly at a high current density can be obtained.

The surface property and the porosity of the surface layer can be controlled according to the composition of a paste containing the water repellent resin particle and the water repellent binder material, the concentration of solid components of the paste, and the temperature and time necessary to dry the paste applied onto the surface of the diffusion layer. In the case of using an electrolyte membrane having a large methanol crossover (i.e., having a large methanol flux value), for example, the surface layer containing the water repellent resin fine particle and the water repellent binder material preferably has a thickness of 10 to 60 μm because the balance between the flux value of the fuel and the removability of carbon dioxide can be optimized.

The surface layer containing the water repellent resin fine particle and the water repellent binder material preferably has a porosity of 50 to 95%. The reason therefore is the same as above.

The water repellent resin fine particle preferably has an average particle size of 1 to 10 μm.

The surface layer 30 having a porous structure may comprise, instead of the water repellent resin fine particle and the water repellent binder material, an electron conductive porous material and a water repellent binder material. Examples of the water repellent binder material are the same as given above. Examples of the electron conductive porous material include carbon black, activated carbon and metal oxides.

In this case also, it is possible to ensure that a certain amount of fuel is supplied to the catalyst layer. At the same time, the reduction of methanol crossover can be achieved.

The surface layer containing the electron conductive porous material has excellent electron conductivity. For this reason, there is the advantage that it is unnecessary to mask the portions of the surface layer to be in contact with the ribs of the separator when forming the surface layer on the surface of the anode diffusion layer.

In the case of forming the surface layer containing the electron conductive porous material and the water repellent binder material on a surface of the anode diffusion layer 12b, the methanol flux value $J_{GDL}$ of the diffusion layer 12b can be adjusted by changing the porosity and the thickness of the surface layer. The porosity of the surface layer can be controlled according to the composition of a paste containing the electron conductive porous material and the water repellent binder material, the concentration of solid components of the paste, and the temperature and time necessary to dry the paste applied onto the surface of the diffusion layer.

In the case of using an electrolyte membrane having a large methanol crossover, for example, the surface layer containing the electron conductive porous material and the water repellent binder material preferably has a thickness of 20 to 100 μm. The surface layer preferably has a porosity of 35 to 85%. The reason therefor is the same as above.

The surface layer 30 can be formed as follows, for example.

A water repellent paste composed mainly of a water repellent resin fine particle (e.g., polytetrafluoroethylene (PTFE) resin fine particle or tetrafluoroethylene-hexafluoropropylene copolymer (FEP) resin fine particle) and a water repellent binder material (e.g., fluorocarbon resin or silicon resin) is applied onto a surface of the anode diffusion layer by spray coating, followed by drying, whereby the surface layer 30 can be formed.

Alternatively, the surface layer 30 can be formed by applying a paste composed mainly of a conductive carbon particle and the water repellent resin fine particle onto a surface of the diffusion layer 12b by wet application, and drying the paste.

The surface layer 30 may be formed on each surface of the anode diffusion layer 12b, or it may be formed only on one surface of the anode diffusion layer 12b. In the case of forming the surface layer 30 only on one surface of the diffusion layer 12b, the surface layer 30 may be formed on the surface of the diffusion layer 12b to be in contact with the separator 14, or on the surface of the diffusion layer 12b to be in contact with the catalyst layer 12a.

The surface layer 30 may be a single layer, or it may be formed of two layers or more. The surface layer 30 may comprise, for example, a layer containing a water repellent resin fine particle and a water repellent binder material and a layer containing an electron conductive porous material and a water repellent binder material.

Preferably, the anode diffusion layer 12b has an air permeability $Q_{Air}$ of 200 to 1000 cc/(cm$^2$·min.·kPa). When the anode diffusion layer 12b has an air permeability within the range, the removability (gas permeability) of carbon dioxide gas produced at the cathode can be improved.

Similar to the case of adjusting the methanol flux value of the diffusion layer 12b, the air permeability of the diffusion layer 12b can be adjusted by changing the thickness and the material of the diffusion layer 12b. In the case of forming the surface layer 30 on a surface of the diffusion layer 12b, the air permeability of the diffusion layer 12b can be adjusted by changing the composition material, surface property, porosity and thickness of the surface layer 30.

When the air permeability $Q_{Air}$ is less than 200 cc/(cm$^2$·min.·kPa), because the permeability of carbon dioxide is low, power generation characteristic at a high current density degrades. When the air permeability $Q_{Air}$ is greater than 1000 cc/(cm$^2$·min.·kPa), current collecting efficiency degrades.

In order to ensure removability of carbon dioxide when the surface layer formed on a surface of the diffusion layer contains an electron conductive porous material and a water repellent binder material, the ratio of the electron conductive porous material and the water repellent binder material contained in the surface layer, the thickness of the surface layer, etc, is preferably optimized. For example, the ratio of the electron conductive porous material and the water repellent binder material contained in the surface layer is preferably 5:1 to 1:5. The surface layer preferably has a thickness of 20 to 100 μm as stated previously. As for the electrolyte membrane 11, the membrane should have excellent proton conductivity, thermal resistance and chemical stability. At the same time, the electrolyte membrane 11 should have a methanol flux value that yields a product $J_{PEM} \times J_{GDL}$ of not greater than $1 \times 10^{-8}$ [(mol/cm$^2$·min.)]$^2$. The electrolyte membrane 11 may be made of any material as long as the material has the above properties.

As the anode catalyst layer 12a and the cathode catalyst layer 13a, a thin film composed mainly of a polymer electrolyte and a conductive carbon particle or catalyst metal fine particle carrying a catalyst metal can be used. An example of the catalyst metal for the catalyst layer 12a is a platinum (Pt)-ruthenium (Ru) alloy fine particle. An example of the catalyst metal for the catalyst layer 13a is a Pt fine particle. The polymer electrolyte contained in the catalyst layer may be the same as that of the electrolyte membrane 11 or other polymer electrolyte. Preferred is the same polymer electrolyte as that of the electrolyte membrane 11.

The cathode diffusion layer 13b can be made of a conductive porous material having air diffusibility, removability of water generated during power generation and electron conductivity. Examples of such material include carbon paper and carbon cloth.

The separators 14 and 15 can be made of an air-tight, electron conductive and electrochemically stable material. The separators may be made of any type of material as long as the material has the above-described properties. The shape of the flow channel 16 formed on the separator 14 and that of the flow channel 17 formed on the separator 15 are not specifically limited. Any conventional shape known in the pertinent art can be used.

A description will be given of a method for measuring the methanol flux value and the air permeability.

(1) Methanol Flux Value

Figure 4:
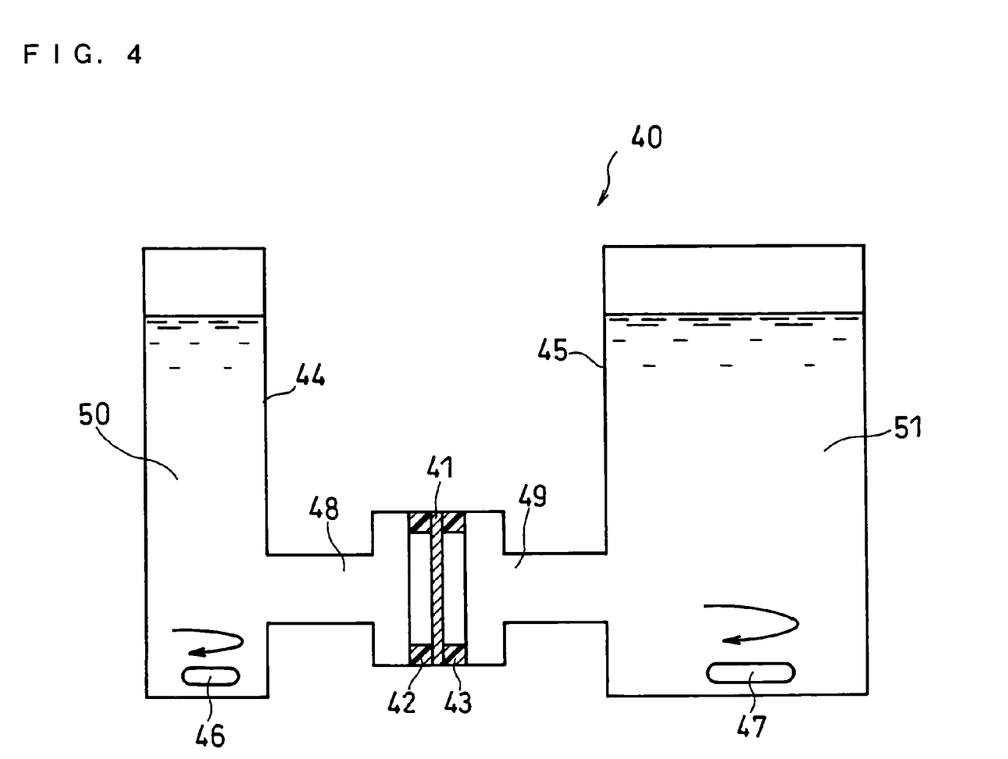
FIG. 4 is a schematic diagram of an apparatus for measuring methanol flux value.

Methanol flux value can be measured using an H-shaped cell 40 made of glass as shown in FIG. 4.

A sample 41 (diffusion layer or electrolyte membrane) is fixed with ring-shaped rubber sheets 42 and 43 between pipes 48 and 49 of the H-shaped cell 40 in a thermostatic chamber having the same temperature as the fuel cell operating temperature.

Subsequently, an aqueous solution of methanol 50 having a certain methanol concentration is admitted to a first glass vessel 44, and ion exchange water 51 is admitted to a second glass vessel 45. The concentration of methanol in the aqueous solution should be the same as that of methanol contained in the fuel to be supplied to a fuel cell. The aqueous solution of methanol and the ion exchange water are stirred by stirrers 46 and 47, respectively, at a certain rate, during which about 1 cc of the aqueous solution held in the second glass vessel 45 is taken at predetermined time intervals for gas chromatography analysis to quantify the concentration of methanol contained in the sampling solution. Methanol flux value can be calculated from the increased amount of methanol per unit time.

(2) Air Permeability

In the present invention, the air permeability of the anode diffusion layer means the rate at which air permeates through the anode diffusion layer at room temperature. The air permeability of the diffusion layer can be measured by, for example, a physical property measuring instrument (e.g., Perm Porometer available from Porous Materials, Inc.). A sample having a certain area is held between two pressing plates, each having a channel for flowing air, at a certain pressure. Under the compressed condition, the pressure difference between at the air-supply side and at the air-permeation side is increased to a maximum, during which the air flux values are measured. The measured air flux values are plotted against the pressure difference to obtain a straight line that most clearly shows the measured values. The slope of the straight line is then calculated. The obtained slope can be interpreted as air permeability.

Note that the pressure for pressing the sample should be the same as that applied when the separators and the MEA are clamped.

The porosity of the surface layer can be calculated from, for example, the composition ratio of the materials forming the surface layer, the specific gravities of the materials, the amount of the surface layer applied to a unit area and the thickness of the surface layer. When the surface layer comprises a component A having a specific gravity of $R_A$ (g/cm$^3$) and a component B having a specific gravity of $R_B$ (g/cm$^3$), the amount of the surface layer applied to a unit area is w (g/cm$^2$), the thickness of the surface layer is T (cm), and the composition ratio of the components A and B is a:b, the porosity of the surface layer can be calculated by the following equation:

$$\{1-[w \times (a/(a+b))/R_A + w \times (b/(a+b))/R_B]/(1 \times 1 \times T)\} \times 100.$$

The fuel cell of the present invention can generate power as follows, for example.

Firstly, an anode diffusion layer and an electrolyte membrane which satisfy the following conditions are selected (step (a)). When the anode diffusion layer has a methanol flux value $J_{GDM}$, and the electrolyte membrane has a methanol flux value $J_{PEM}$, which are measured by allowing the anode diffusion layer and the electrolyte membrane to come into contact with an aqueous solution having a certain methanol concentration at a certain temperature, the anode diffusion layer has a methanol flux value $J_{GDM}$ of $1 \times 10^{-5}$ to $5 \times 10^{-4}$ mol/(cm$^2$·min.), and a product obtained by multiplying the $J_{PEM}$ by the $J_{GDM}$ is not greater than $1 \times 10^{-8}$ [mol/(cm$^2$·min.)]$^2$.

In this step, the methanol flux value of the anode diffusion layer can be adjusted by changing the thickness of the anode diffusion layer as described above and/or forming the surface layer as described above on a surface of the diffusion layer.

Subsequently, based on the temperature and the methanol concentration used for the measurement of methanol flux value, a concentration of methanol to be contained in the fuel and a temperature for operating the fuel cell are determined (step (b)). In this step, the methanol concentration used for the measurement of methanol flux value may be determined as methanol concentration of fuel, and the temperature used for the measurement of methanol flux value may be determined as operating temperature of the fuel cell. Even if the same diffusion layers and electrolyte membranes are used, methanol flux value varies according to the temperature and the methanol concentration used for the measurement of methanol flux value. For this reason, the operating temperature of the fuel cell and the methanol concentration of fuel may be adjusted so as to improve power generation characteristic in a range that they do not affect the methanol flux value.

Then, electricity (power) is generated at the temperature determined in the above step (b) by feeding a fuel containing methanol at the concentration determined in the above step (b) to the anode (step (c)).

As described above, even when the operation temperature of the fuel cell and the methanol concentration of the fuel are specified values, the methanol flux values of the anode diffusion layer and the electrolyte membrane can be determined according to the specified values. Thereby, the power generation characteristic of the fuel cell can be improved.

For example, in the case of using an electrolyte membrane having a large methanol crossover, in order to produce a small fuel cell system and to achieve longer operation of the fuel cell system, the concentration of methanol contained in the fuel is preferably 4 to 6 mol/L. When the methanol concentration exceeds 6 mol/L, the methanol flux value of the electrolyte membrane becomes significantly large. For this reason, it is difficult to appropriately control the methanol flux value of the anode diffusion layer.

In the case of using an electrolyte membrane having a small methanol crossover, the concentration of methanol contained in the fuel may be 6 mol/L or greater. In this case also, the porosity and the thickness of the surface layer is not specifically limited as long as they fall within the above-described ranges.

The operating temperature of the fuel cell is preferably 40 to 80° C., more preferably 50 to 70° C. As the operating temperature of the fuel cell is increased, the reaction activity of the catalyst increases, resulting in improved power generation characteristic. However, if the operating temperature is too high, the electronic components around the fuel cell will be affected. Considering the power generation characteristic and the effect on the electronic components, the above temperature range is the best.

The present invention will be described in further detail below with reference to examples, but it should be understood that the present invention is not limited to the examples given below.

EXAMPLE 1

(Fuel Cell A)

(Production of Catalyst Carrying Particle)

A catalyst-carrying particle for anode was produced by allowing a conductive carbon particle to carry Pt and Ru each having an average particle size of 3 nm. The amounts of Pt and Ru were 30% of the total weight of Pt, Ru and the conductive carbon particle.

A catalyst-carrying particle for cathode was produced by allowing a conductive carbon particle (the same one as used above) to carry Pt having an average particle size of 3 nm. The amount of Pt was 50% of the total weight of Pt and the conductive carbon particle. The conductive carbon particle used here was carbon black having an average primary particle size of 30 nm (Ketjen black EC available from Mitsubishi Chemical Corporation).

(Production of MEA)

Subsequently, a dispersion prepared by dispersing the catalyst-carrying particle for anode in an aqueous solution of isopropanol was mixed with a dispersion prepared by dispersing a polymer electrolyte in ethanol. The obtained mixture was further mixed by a bead mill so as to disperse the catalyst-carrying particle for anode and the polymer electrolyte. Thereby, a paste for anode catalyst layer was prepared. The polymer electrolyte used here was perfluorocarbon sulphonic acid ionomer (Flemion available from Asahi Glass Co., Ltd.). The paste for anode catalyst layer contained the conductive carbon particle and the polymer electrolyte at a weight ratio of 1:1.

Using the catalyst-carrying particle for cathode prepared above, a paste for cathode catalyst layer was prepared in the same manner as the paste for anode catalyst layer was prepared.

Each of the pastes was applied onto a polytetrafluoroethylene sheet (Naflon PTFE sheet available from Nichias Corporation) by a doctor blade, followed by drying in an atmosphere at room temperature for 6 hours. Each of the obtained catalyst sheets was cut into a size of 6 cm×6 cm. The cut-out anode catalyst sheet was laminated on one surface of an electrolyte membrane with the paste-applied surface of the anode catalyst sheet in contact with the surface of the electrolyte membrane. On the other surface of the electrolyte membrane was laminated the cut-out cathode catalyst sheet with the paste-applied surface of the cathode catalyst sheet in contact with the other surface of the electrolyte membrane. The electrolyte membrane and the catalyst sheets were heat-bonded by hot pressing at 125° C. under a pressure of 8 MPa for 5 minutes. The electrolyte membrane used here was perfluoroalkylsulphonic acid ion exchange membrane (Nafion 117 available from E.I. Du Pont de Nemours & Co. Inc., USA).

The polytetrafluoroethylene sheets were then peeled from the assembly produced above. Thereby, an anode catalyst layer and a cathode catalyst layer were formed. The anode and cathode catalyst layers each contained 1.8 mg/cm$^2$ of the Pt catalyst.

As the anode diffusion layer, carbon paper (TGP-H120 available from Toray Co., Ltd. (thickness: about 360 μm)) cut into a size of 6 cm×6 cm was used. The portions of the anode diffusion layer to be in contact with the ribs, each located between adjacent flow channels, of a separator were masked. Then, to the surface of the anode diffusion layer to be in contact with the separator was applied a super-water repellent composed mainly of a polytetrafluoroethylene resin fine particle and a silicon resin (HIREC1450 available from NTT Advanced Technology Corporation) by spray coating. The applied super-water repellent was dried at 60° C. for 30 minutes. Thereby, a surface layer (hereinafter referred to as first layer) containing the super-water repellent was formed on the surface of the diffusion layer. The formed first layer had a thickness of about 20 μm and a porosity of 77.0%. The first layer had a fractal surface. Note that the formation of the first layer in the examples below was carried out in the same manner as above.

As the cathode diffusion layer, carbon paper (TGP-H060 available from Toray Co., Ltd. (thickness: about 180 μm)) cut into a size of 6 cm×6 cm was used.

Subsequently, the anode diffusion layer was laminated on the surface of the electrolyte membrane having the anode catalyst layer formed thereon. The cathode diffusion layer was laminated on the other surface of the electrolyte membrane having the cathode catalyst layer formed thereon. The diffusion layers were bonded to the catalyst layers by hot pressing at 125° C. under a pressure of 4 MPa for 3 minutes.

Finally, gas sealants were placed on the outer peripheries of the anode and the cathode, and heat sealing was performed at 135° C. under a pressure of 4 MPa for 30 minutes. Thereby, an MEA was produced.

The obtained MEA was then sandwiched by separators having an outer size of 10 cm×10 cm and a thickness of 4 mm, current collector plates, heaters, insulating plates and end plates. The whole was then fixed with clamping rods. The clamping pressure used here was 20 kgf/cm$^2$ per unit area of the separator. The separators had a serpentine flow channel having a width of 1.5 mm and a depth of 1 mm formed on the surface thereof. The current collector plates and the end plates used here were made of a stainless steel plate plated with gold.

A fuel cell comprising the unit cell produced in the manner described above was denoted as cell A.

(Fuel Cell B)

A fuel cell B was produced in the same manner as the fuel cell A was produced except that a surface layer comprising a mixture of carbon black (CB) and a polytetrafluoroethylene (PTFE) resin fine particle was formed on the surface of the anode diffusion layer to be in contact with the anode catalyst layer. The thickness of the surface layer was about 50 μm.

The surface layer was produced as follows.

Firstly, carbon black (XC-72R available from CABOT Corporation) was ultrasonically dispersed in an aqueous solution having a surfactant (Triton X-100 available from Sigma-Aldrich, Inc.) added thereto, after which the mixture was further mixed by a mixer (HIVIS MIX available from Tokushu Kika Kogyo Co, Ltd) so as to bring the carbon black into a highly dispersed state. A polytetrafluoroethylene dispersion (D-1E available from Daikin Industries, Ltd.) was then added to the above mixture, which was further mixed to bring the mixture into a highly dispersed state. Thereby, a paste was prepared. The paste contained the carbon black, polytetrafluoroethylene and the surfactant at a weight ratio of 10/3/1.

The obtained paste was uniformly applied onto the entire surface of carbon paper by a doctor blade, followed by drying in an atmosphere at room temperature for 8 hours, which was then baked at 360° C. in an inert gas ($N_2$) atmosphere for 1 hour to remove the surfactant. Thereby, a surface layer (hereinafter referred to as second layer) containing the CB and (PTFE) resin fine particles was formed. The second layer had a porosity of 65.1%. Note that the formation of the second layer in the examples below was carried out in the same manner as above.

(Fuel Cell C)

A second layer having a thickness of about 30 μm was first formed on the surface of the anode diffusion layer to be in contact with a separator. On the second layer was further formed a first layer having a thickness of about 20 μm. Thereby, a surface layer comprising the first and second layers was formed. Using the thus-produced anode diffusion layer, a fuel cell C was produced in the same manner as the fuel cell A was produced. The first and second layers had a porosity of 77.0% and 62.8%, respectively. The first layer had a fractal surface.

(Fuel Cell D)

A fuel cell D was produced in the same manner as the fuel cell C was produced except that the second layer had a thickness of about 50 μm and that the first layer had a thickness of about 30 μm. The first and second layers had a porosity of 78.5% and 65.1%. The first layer had a fractal surface.

(Fuel Cell E)

A fuel cell E was produced in the same manner as the fuel cell A was produced except for the following.

As the electrolyte membrane, a hydrocarbon polymer electrolyte membrane composed mainly of sulfonated polyetheretherketon (PEEK) having a thickness of 100 μm was used. As the anode diffusion layer, carbon paper (TGP-H060 available from Toray Co., Ltd.) was used. On the surface of the diffusion layer to be in contact with the catalyst layer was formed a second layer having a thickness of about 5 μm. The second layer had a porosity of 58.1%.

(Fuel Cell F)

A fuel cell F was produced in the same manner as the fuel cell A was produced except that a hydrocarbon polymer electrolyte membrane composed mainly of sulfonated polyetheretherketon (PEEK) having a thickness of 60 μm was used as the electrolyte membrane, and that the surface layer was not formed on the surface of the anode diffusion layer.

(Comparative Fuel Cell 1)

A comparative fuel cell 1 was produced in the same manner as the fuel cell A was produced except that the surface layer was not formed on the surface of the anode diffusion layer.

(Comparative Fuel Cell 2)

A comparative fuel cell 2 was produced in the same manner as the fuel cell A was produced except that carbon paper (TGP-H060 available from Toray Co., Ltd.) was used as the anode diffusion layer, and that the surface layer was not formed on the surface of the anode diffusion layer.

(Comparative Fuel Cell 3)

A comparative fuel cell 3 was produced in the same manner as the fuel cell A was produced except that a first layer having a thickness of about 80 μm was formed on the surface of the anode diffusion layer to be in contact with a separator. The first layer had a porosity of 79.8% and a fractal surface.

(Comparative Fuel Cell 4)

A comparative fuel cell 4 was produced in the same manner as the fuel cell A was produced except for the following.

As the electrolyte membrane, a hydrocarbon polymer electrolyte membrane composed mainly of sulfonated polyetheretherketon (PEEK) having a thickness of 60 μm was used. A second layer having a thickness of about 80 μm was formed on the surface of the anode diffusion layer to be in contact with a separator. On the second layer was further formed a first layer having a thickness of about 50 μm. Thereby, a surface layer comprising the first and second layers was formed on the surface of the anode diffusion layer. The first and second layers had a porosity of 80.6% and 66.8%, respectively. The first layer had a fractal surface.

Table 1 shows the type of the electrolyte membrane and the composition of the surface layer formed on the surface of the anode diffusion layer for the fuel cells A to F and the comparative fuel cells 1 to 4.

TABLE 1

|  | Surface layer formed | Electrolyte membrane |
| --- | --- | --- |
| Fuel cell A | First layer (20 μm) | Perfluorocarbon sulfonic acid membrane |
| Fuel cell B | Second layer (50 μm) | Perfluorocarbon sulfonic acid membrane |
| Fuel cell C | First layer (20 μm) + Second layer (30 μm) | Perfluorocarbon sulfonic acid membrane |
| Fuel cell D | First layer (30 μm) + Second layer (50 μm) | Perfluorocarbon sulfonic acid membrane |
| Fuel cell E | Second layer (5 μm) | Hydrocarbon polymer electrolyte membrane (sulfonated PEEK) |
| Fuel cell F | None | Hydrocarbon polymer electrolyte membrane (sulfonated PEEK) |
| Comp. Fuel cell 1 | None | Perfluorocarbon sulfonic acid membrane |
| Comp. Fuel cell 2 | None | Perfluorocarbon sulfonic acid membrane |
| Comp. Fuel cell 3 | First layer (80 μm) | Perfluorocarbon sulfonic acid membrane |
| Comp. Fuel cell 4 | First layer (50 μm) + Second layer (80 μm) | Hydrocarbon polymer electrolyte membrane (sulfonated PEEK) |

The electrolyte membranes and the anode diffusion layers of the fuel cells A to F and the comparative fuel cells 1 to 4 were analyzed for methanol flux value according to the procedure described previously, and the anode diffusion layers were additionally analyzed for air permeability according to the procedure described previously.

In the methanol flux value measurement, the methanol concentration of the aqueous solution of methanol used for the measurement was set at 6 mol/L. The thermostatic chamber was maintained at a temperature of 60° C. The openings of the ring-shaped rubber sheets had an area of 3.14 cm². The first glass vessel 44 contained 50 cc of an aqueous solution of methanol. The second glass vessel 45 contained 200 cc of ion exchange water.

In the air permeability measurement, the sample had an area of 7 cm². The pressure for pressing the sample was set at 20 kgf/cm². The pressure difference between at the air-supply side and at the air-permeation side of the sample was increased to 3 kPa at the maximum. The obtained results are shown in Table 2.

TABLE 2

| | $J_{GDL}$ (mol/ (cm$^2$·min.)) | $J_{PEM}$ (mol/ (cm$^2$·min.)) | $J_{GDL} \times J_{PEM}$ ([mol/ (cm$^2$·min.)]$^2$) | $Q_{AIR}$ (cc/(cm$^2$· min.·kPa)) |
|---|---|---|---|---|
| Fuel cell A | $5.6 \times 10^{-5}$ | $8.9 \times 10^{-5}$ | $5.0 \times 10^{-9}$ | 490 |
| Fuel cell B | $9.3 \times 10^{-5}$ | $8.9 \times 10^{-5}$ | $8.3 \times 10^{-9}$ | 280 |
| Fuel cell C | $3.7 \times 10^{-5}$ | $8.9 \times 10^{-5}$ | $3.3 \times 10^{-9}$ | 360 |
| Fuel cell D | $1.0 \times 10^{-5}$ | $8.9 \times 10^{-5}$ | $8.9 \times 10^{-10}$ | 200 |
| Fuel cell E | $5.0 \times 10^{-4}$ | $2.0 \times 10^{-5}$ | $1.0 \times 10^{-8}$ | 1000 |
| Fuel cell F | $2.7 \times 10^{-4}$ | $3.4 \times 10^{-5}$ | $9.2 \times 10^{-9}$ | 510 |
| Comp. Fuel cell 1 | $2.7 \times 10^{-4}$ | $8.9 \times 10^{-5}$ | $2.4 \times 10^{-8}$ | 510 |
| Comp. Fuel cell 2 | $5.4 \times 10^{-4}$ | $8.9 \times 10^{-5}$ | $4.8 \times 10^{-8}$ | 1140 |
| Comp. Fuel cell 3 | $7.3 \times 10^{-6}$ | $8.9 \times 10^{-5}$ | $6.5 \times 10^{-10}$ | 390 |
| Comp. Fuel cell 4 | $5.1 \times 10^{-6}$ | $3.4 \times 10^{-5}$ | $1.7 \times 10^{-10}$ | 110 |

Subsequently, the fuel cells A to F and the comparative fuel cells 1 to 4 were analyzed for current-voltage characteristic in the manner described below.

Each fuel cell was continuously operated at a current density of 100 mA/cm$^2$ or 200 mA/cm$^2$ at a cell temperature of 60° C. for 15 minutes while an aqueous solution of methanol at a concentration of 6 mol/L was fed to the anode at a flow rate of 1 cc/min and air was fed to the cathode at a flow rate of 1 L/min. During the continuous operation, the effective voltage was measured. The results are shown in Table 3.

TABLE 3

| | Current-voltage characteristic | |
|---|---|---|
| | Voltage at 100 mA/cm$^2$ (V) | Voltage at 200 mA/cm$^2$ (V) |
| Fuel cell A | 0.458 | 0.346 |
| Fuel cell B | 0.426 | 0.305 |
| Fuel cell C | 0.442 | 0.324 |
| Fuel cell D | 0.376 | 0.258 |
| Fuel cell E | 0.384 | 0.286 |
| Fuel cell F | 0.411 | 0.292 |
| Comp. Fuel cell 1 | 0.205 | Unable to retain voltage |
| Comp. Fuel cell 2 | 0.138 | Unable to retain voltage |
| Comp. Fuel cell 3 | 0.321 | 0.177 |
| Comp. Fuel cell 4 | 0.246 | 0.112 |

In each of the fuel cells A to F, because the physical properties of the anode diffusion layer and the electrolyte membrane were optimized to suit the fuel cell operating conditions (the use of an aqueous solution of methanol at a concentration of 6 mol/L as the fuel, and an operating temperature of 60° C.), it was possible to reduce methanol crossover, to ensure a sufficient amount of fuel supplied to the anode catalyst layer, and to improve the carbon dioxide gas removability of the anode diffusion layer, all simultaneously. As evident from Table 3, the fuel cells had excellent power generation characteristic particularly at a higher current density without impairing the fuel utilization efficiency.

In the comparative fuel cells 1 and 2, on the other hand, in which the electrolyte membrane having a large methanol crossover and the thin anode diffusion layer were used, the product obtained by multiplying the methanol flux value of the electrolyte membrane by that of the anode diffusion layer (i.e., the product of $J_{GLD} \times J_{PEM}$) was over $1 \times 10^{-8}$ [(mol/cm$^2$·min.)]$^2$. In other words, the amount of methanol crossing through the membrane from the anode to the cathode increased significantly. This led to the degradation of power generation characteristic (the voltage was unable to be retained at a current density of 200 mA/cm$^2$). The degradation of power generation characteristic was more remarkable in the comparative battery 2 having a methanol flux value $J_{GDL}$ of greater than $5 \times 10^{-4}$ mol/(cm$^2$·min.).

In the comparative fuel cells 3 and 4, the product of $J_{GDL} \times J_{PEM}$ was small, and the reduction of methanol crossover was achieved. However, the anode diffusion layer had a methanol flux value of less than $1 \times 10^{-5}$ mol/(cm$^2$·min.). Because of this, the supply rate of the fuel to the anode catalyst layer was lower than the consumption rate of the fuel during power generation at a higher current density, and therefore the power generation characteristic at a higher current density was significantly low. The comparative fuel cell 4 in which the thick surface layer was formed on the surface of the anode diffusion layer, in particular, had a low air permeability $Q_{air}$ of less than 200 cc/(cm$^2$·min.·kPa), and thus the removability of carbon dioxide in the anode diffusion layer was poor. Presumably, this is one of the factors that significantly degraded power generation characteristic at a higher current density.

A comparison between the fuel cells A and B shows that the fuel cell A exhibited improved power generation characteristic although the surface layer of the fuel cell A was thinner. This can be explained as follows. The first layer was an aggregate of the water repellent resin fine particles formed by deposition of the particles on the diffusion layer, so that there was asperities derived from the shape of the water repellent resin fine particle (fractal surface) in the surface of the first layer and the inner wall of pores of the first layer. Due to the asperity of the surface of the first layer and the inner wall of pores of the first layer, the water repellency was improved, exhibiting the super-water repellency. For this reason, the fuel cell A exhibited improved power generation characteristic although the surface layer of the fuel cell A was thinner.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A direct methanol fuel cell comprising a unit cell having an electrolyte membrane, an anode on one surface of said electrolyte membrane, and a cathode on an other surface of said electrolyte membrane, said anode comprising an anode catalyst layer and an anode diffusion layer, said anode catalyst layer being in contact with a surface of said electrolyte membrane, said anode diffusion layer being in contact with a surface of said anode catalyst layer opposite to said surface of said anode catalyst layer in contact with said electrolyte membrane, wherein a methanol flux value $J_{GDL}$ of said anode diffusion layer and a methanol flux value $J_{PEM}$ of said electrolyte membrane satisfy the following relations:

$J_{GDL} = 1 \times 10^{-5}$ to $5 \times 10^{-4}$ mol/(cm$^2$·min.),  (i)

$J_{PEM} \geq 2 \times 10^{-5}$ mol/(cm$^2$·min.),  (ii)

and $J_{PEM} \times J_{GDL} \leq 1 \times 10^{-8}$ [mol/(cm$^2$·min.)]$^2$  (iii).

2. The direct methanol fuel cell in accordance with claim 1, wherein said anode diffusion layer has an air permeability $Q_{Air}$ of 200 to 1000 cc/(cm$^2$·min.·kPa).

3. The direct methanol fuel cell in accordance with claim 1, wherein a surface layer having a porous structure is formed on a surface of said anode diffusion layer, and said surface layer comprises a water repellent resin fine particle and a water repellent binder material.

4. The direct methanol fuel cell in accordance with claim 1, wherein a surface layer having a porous structure is formed on a surface of said anode diffusion layer, and said surface layer comprises an electron conductive porous material and a water repellent binder material.

5. A method for generating power using a direct methanol fuel cell comprising a unit cell having an electrolyte membrane, an anode on one surface of said electrolyte membrane, and a cathode on an other surface of said electrolyte membrane, said anode comprising an anode catalyst layer and an anode diffusion layer, said anode catalyst layer being in contact with a surface of said electrolyte membrane, said anode diffusion layer being in contact with a surface of said anode catalyst layer opposite to said surface of said anode catalyst layer in contact with said electrolyte membrane, said method comprising the steps of:

(a) selecting an anode diffusion layer and an electrolyte membrane such that a methanol flux value $J_{GDL}$ of said anode diffusion layer and a methanol flux value $J_{PEM}$ of said electrolyte membrane, which are measured by allowing said anode diffusion layer and said electrolyte membrane to come into contact with an aqueous solution having a certain methanol concentration at a certain temperature, satisfy the following relations:

$$J_{GDL}=1\times10^{-5} \text{ to } 5\times10^{-4} \text{ mol/(cm}^2\cdot\text{min.)}, \qquad \text{(i)}$$

$$J_{PEM} \geq 2\times10^{-5} \text{ mol/(cm}^2\cdot\text{min.)}, \qquad \text{(ii)}$$

and $$J_{PEM} \times J_{GDL} \geq 1\times10^{-5} \text{ [mol/(cm}^2\cdot\text{min.)}]^2 \qquad \text{(iii)}$$

(b) determining a concentration of methanol to be contained in fuel and a temperature for operating said fuel cell based on the temperature and the methanol concentration used for said measurement of said $J_{GDL}$ and said $J_{PEM}$; and (c) generating power at said temperature determined in said step (b) by feeding fuel containing methanol at the concentration determined in said step (b) to said anode.

6. The direct methanol fuel cell in accordance with claim 3, wherein said surface layer comprises at least one of a polytetrafluoroethylene resin fine particle and a tetrafluoroethylene-hexafluoropropylene copolymer resin fine particle as said water repellent resin fine particle, and at least one of fluorocarbon resin and silicon resin as said water repellent binder material.

7. A direct methanol fuel cell comprising a unit cell having an electrolyte membrane, an anode on one surface of said electrolyte membrane, and a cathode on an other surface of said electrolyte membrane, said anode comprising an anode catalyst layer and an anode diffusion layer, said anode catalyst layer being in contact with a surface of said electrolyte membrane, said anode diffusion layer being in contact with a surface of said anode catalyst layer opposite to said surface of said anode catalyst layer in contact with said electrolyte membrane, wherein a methanol flux value $J_{GDL}$ of said anode diffusion layer and a methanol flux value $J_{PEM}$ of said electrolyte membrane satisfy the following relations:

$$J_{GDL}=1\times10^{-5} \text{ to } 5\times10^{-4} \text{ mol/(cm}^2\cdot\text{min.)}, \qquad \text{(i)}$$

$$J_{PEM} \geq 2\times10^{-5} \text{ mol/(cm}^2\cdot\text{min.)}, \qquad \text{(ii)}$$

and $$J_{PEM} \times J_{GDL} \leq 1\times10^{-8} \text{ [mol/(cm}^2\cdot\text{min.)}]^2, \qquad \text{(iii)}$$

said anode diffusion layer has an air permeability $Q_{Air}$ of 200 to 1000 cc/(cm$^2$·min.·kPa), a surface layer having a porous structure is formed on a surface of said anode diffusion layer, and said surface layer comprises at least one of a mixture of a water repellent resin fine particle and a water repellent binder material, and a mixture of an electron conductive porous material and a water repellent binder material.

* * * * *